(12) United States Patent
Wimmer

(10) Patent No.: US 11,427,133 B2
(45) Date of Patent: Aug. 30, 2022

(54) LADDER RACK

(71) Applicant: Eric L. Wimmer, Ogden, UT (US)

(72) Inventor: Eric L. Wimmer, Ogden, UT (US)

( * ) Notice: Subject to any disclaimer, the term of this patent is extended or adjusted under 35 U.S.C. 154(b) by 0 days.

(21) Appl. No.: 17/163,231

(22) Filed: Jan. 29, 2021

(65) Prior Publication Data

US 2021/0237657 A1 Aug. 5, 2021

Related U.S. Application Data

(60) Provisional application No. 62/970,548, filed on Feb. 5, 2020.

(51) Int. Cl.
*B60R 9/048* (2006.01)
*B60R 9/058* (2006.01)

(52) U.S. Cl.
CPC ............ *B60R 9/0485* (2013.01); *B60R 9/058* (2013.01)

(58) Field of Classification Search
CPC ...... B60R 9/0485; B60R 9/058; B60R 9/0423
See application file for complete search history.

(56) References Cited

U.S. PATENT DOCUMENTS

| | | | | |
|---|---|---|---|---|
| 3,251,519 A * | 5/1966 | Jones | ................... | B60R 9/0485 224/324 |
| 3,283,972 A * | 11/1966 | Kocina | ................. | B60R 9/0485 224/318 |
| 3,606,226 A * | 9/1971 | Bell, Sr. | .................. | E06C 7/488 248/237 |
| 4,618,083 A * | 10/1986 | Weger, Jr. | ............. | B60R 9/0485 224/309 |
| 5,662,254 A * | 9/1997 | Lemajeur | .................. | B60P 3/40 224/405 |
| 5,850,891 A * | 12/1998 | Olms | .................... | B60R 9/0423 182/127 |
| 6,179,543 B1 * | 1/2001 | Adame | ................. | B60R 9/0423 224/310 |
| 6,397,644 B1 * | 6/2002 | Gidding | ................ | B60R 9/0485 182/127 |
| 6,427,889 B1 * | 8/2002 | Levi | ...................... | B60R 9/0423 224/310 |
| 6,764,268 B2 * | 7/2004 | Levi | ...................... | B60R 9/0423 224/310 |
| 9,156,411 B2 * | 10/2015 | Elezaj | .................... | B60R 9/0423 |
| 9,327,654 B2 * | 5/2016 | Richter | ................. | B60R 9/0423 |
| 9,783,119 B1 * | 10/2017 | Lachance | .............. | B60R 9/0485 |
| 9,796,340 B2 * | 10/2017 | Bharucha | .............. | B60R 9/0423 |
| 10,246,025 B1 * | 4/2019 | Knigge | .................... | B60R 9/048 |
| 2004/0026472 A1 * | 2/2004 | Foo | .......................... | B60R 9/048 224/310 |

(Continued)

*Primary Examiner* — Brian D Nash
(74) *Attorney, Agent, or Firm* — Dobbin IP Law, P.C.; Geoffrey E. Dobbin

(57) ABSTRACT

A ladder rack with improved utility may feature a rugged single body construction with multiple bends forming a pocket between two arms. The ladder rack is mountable upon a surface, such as a vehicle roof, and contains a portion of a ladder within it. The ladder is secured transversely within the pocket as the opening is smaller than the width of a ladder rail and the use of two ladder racks, since one arm projects around a ladder rail, will secure against translational movement along the car's length if positioned to abut ladder rungs. An optional S-bend can be utilized to further control of the ladder in stowage and in securing against movement in transit.

5 Claims, 10 Drawing Sheets

(56) References Cited

U.S. PATENT DOCUMENTS

| | | | |
|---|---|---|---|
| 2005/0098595 A1* | 5/2005 | Smith | B60R 9/0485 224/319 |
| 2006/0191967 A1* | 8/2006 | Smith | B60R 9/0485 224/319 |
| 2017/0197554 A1* | 7/2017 | Rouleau | F16B 2/10 |
| 2018/0186298 A1* | 7/2018 | Parker | B60R 9/0485 |
| 2018/0244208 A1* | 8/2018 | Willis | B60R 9/0423 |

* cited by examiner

LADDER RACK

CROSS-REFERENCES TO RELATED APPLICATIONS

This application claims priority as a non-provisional perfection of prior filed a U.S. application 62/970,548, filed Feb. 5, 2020, and incorporates the same in its entirety by reference herein.

FIELD OF THE INVENTION

The present invention relates to the field of racks and more particularly relates to a rack configured to secure a ladder or other long object to a surface, including a vehicle roof.

BACKGROUND OF THE INVENTION

In the service industry the need to transport ladders safely and securely is highly desired. Ladders are designed in various lengths, sizes, and styles. A common issue with transporting ladders is how to attach it to the roof of a vehicle in a quick and secure manner. Some racks have been developed, but they tend to be complicated, involve multiple stowage and deployment steps, require additional securement of the ladder, and in some cased are not compatible with most personal vehicles. More complicated racks, which do not require straps, have a multiplicity of moving parts, and can retail for extremely high prices. Simpler racks still require tie-downs and are not as robust. As such, this ladder rack apparatus is presented as a more modestly priced alternative that is also robust and has no need of additional strapping or tie-downs.

The present invention is a ladder rack mountable to a vehicle roof that can hold a ladder against both transverse and translational movement without the need of further securement to the rack, though additional securement may be added.

The present invention represents a departure from the prior art in that the ladder of the present invention allows for easy mounting on a stowage surface, such as a roof rack, and easy stowage and deployment of a ladder into said rack in a secure manner.

SUMMARY OF THE INVENTION

In view of the foregoing disadvantages inherent in the known types of ladder racks, an improved ladder rack may meet the following objectives: that it be rugged and easily manufactured, that it be easily operated and mounted upon the desired portage surface, that stowage of a ladder be accomplished with minimal effort but still be secure. As such, a new and improved ladder rack may comprise an angular body with an S-bar internal to it and a hook on one leg to accomplish these objectives.

This apparatus gives the operator advantages over the prior art. One advantage is securing the ladder with a one-step placement on the vehicle. No additional effort is required in the form of attaching any tie downs, straps, or other mechanical moving parts to hold the ladder in place. This one-step process saves time and effort on the part of the operator. Using the rack is also intuitive.

One embodiment also gives the advantage of having no mechanical moving parts, levers, joints, or swing arms breaking down or wearing out. This embodiment of the apparatus is fabricated with minimal to no movable joints or additional parts requiring it to operate properly.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
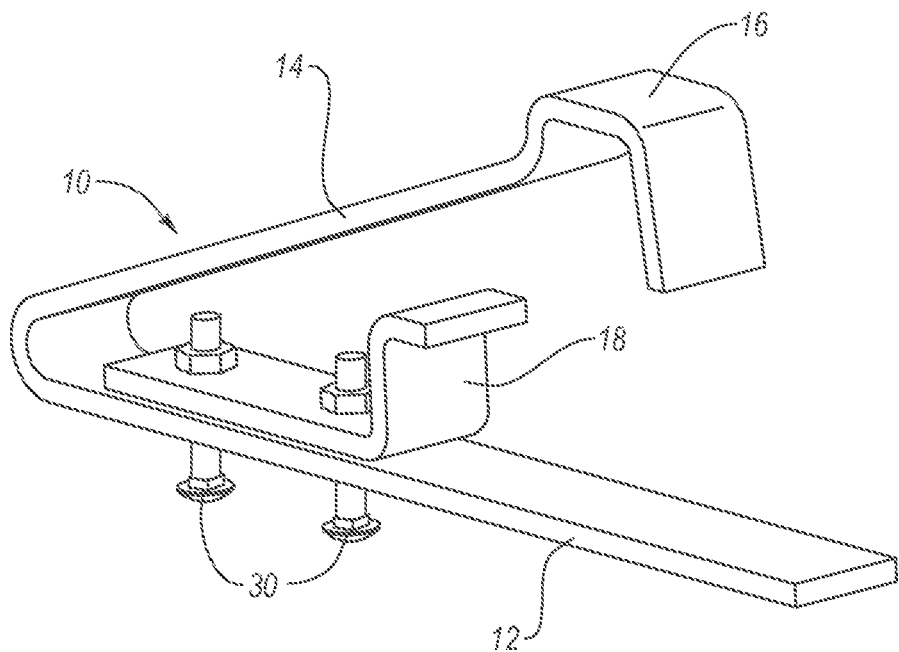
FIG. 1 is a side elevation of one embodiment of a ladder rack according to this invention.
Figure 2:
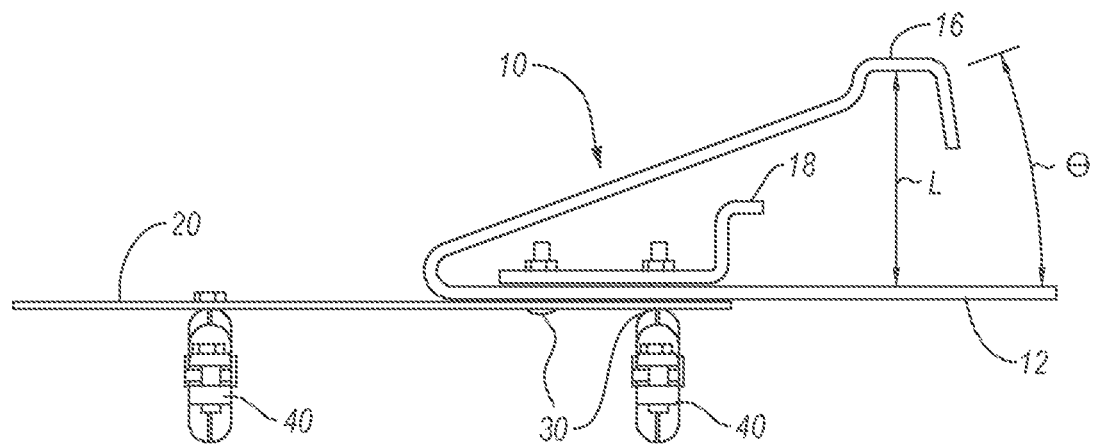
FIG. 2 is a side elevation of the ladder rack of FIG. 1, with an optional crossbar extension and two roof rack mounts.
Figure 3:
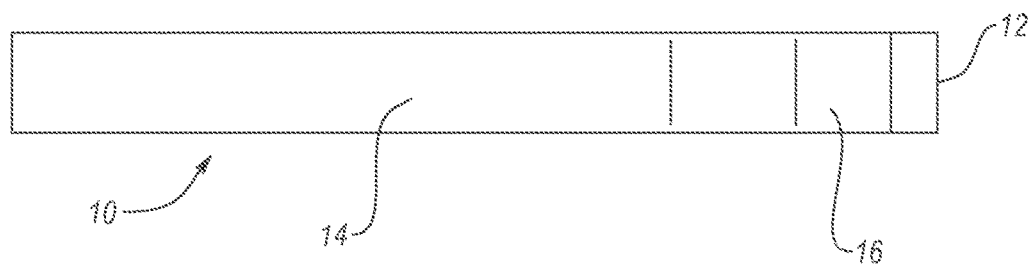
FIG. 3 is a top plan view of the ladder rack of FIG. 1.

With reference now to the drawings, a preferred embodiment of the ladder rack is herein described. It should be noted that the articles "a", "an", and "the", as used in this specification, include plural referents unless the content clearly dictates otherwise.

With reference to FIGS. 1-4, the ladder rack 10 is mostly comprised of a ladder receiver body with two arms 12, 14. This body is the key part that holds the ladder as the ladder will be wedged between arms 12, 14. The body may be made with a 1¼ inch (3.18 cm) by ¼ inch (0.65 cm) thick strip of steel or suitable material. It has four bends at specific points to create a pocket in which the ladder is placed. In the preferred embodiment, the first bend makes an acute angle θ, at about 20°, between lower, base, arm 12 and upper arm 14, giving base arm 12 a length of about 15 inches (38.1 cm). The other three bends form a hook 16 which accommodates an installed ladder's rail. The second bend is 10 inches (25.4 cm) up from the first on upper arm 14. At the second bend, the upper arm 14 is bent almost vertical (straight up) for about 1 inch (2.54 cm). The third bend brings the upper arm 14 roughly parallel to the base arm 12 for a length of about 2 inches (5.08 cm). The fourth bend sends the last section of the upper arm 14 pointing almost completely downwards towards the base arm 12 of the apparatus, forming a lip for hook 16. With these measurements, there is the 5-inch (12.7 cm) opening L from the base arm 12 to the top inside of hook 16 and the lip of the hook may extend about an inch to two inches downward. The pocket, then, is defined by the two arms up to an opening defined between the lip of the hook 16 and base arm 12.

Figure 4:
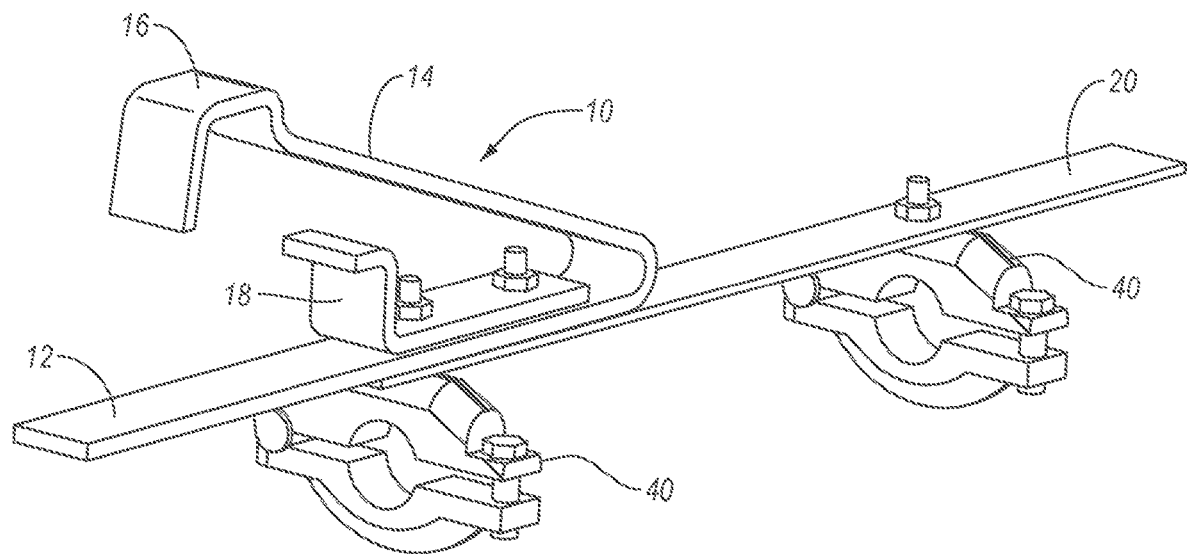
FIG. 4 is a top plan view of the ladder rack of FIG. 2.
Figure 6:
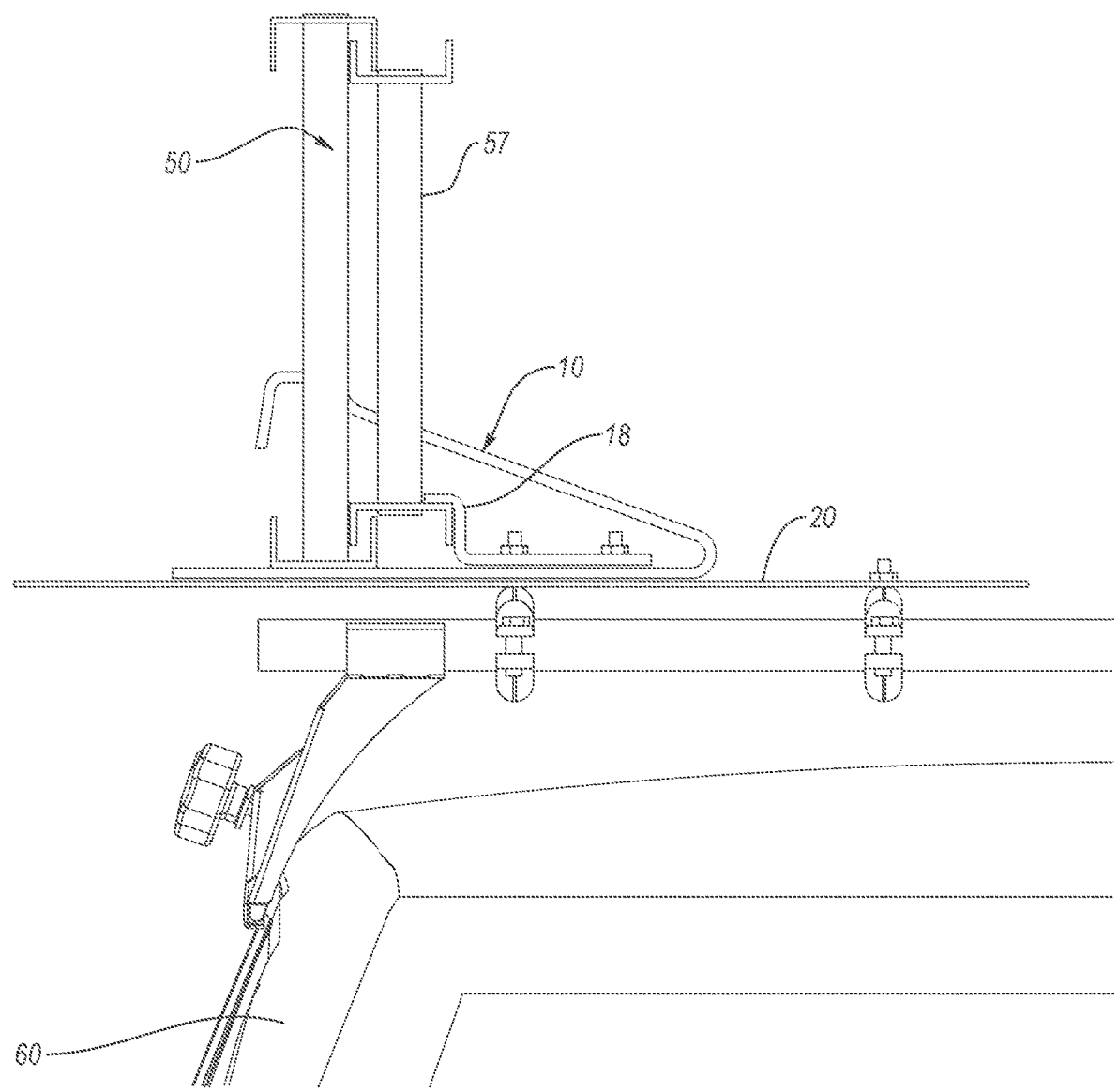
FIG. 6 is a front elevation of the ladder rack and vehicle of FIG. 5, with a ladder in the initial stages of being installed.
Figure 12:
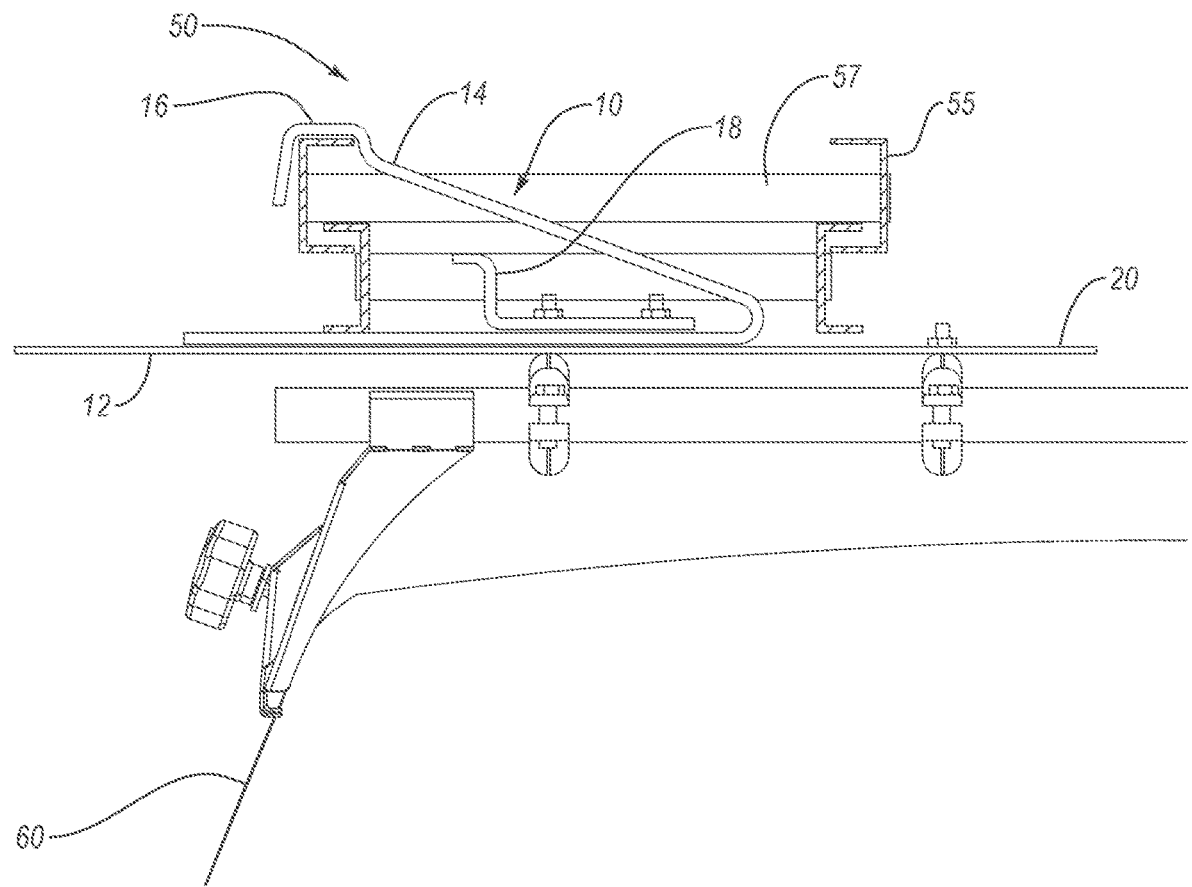
FIG. 12 is a cross-sectional view of the ladder rack and vehicle of FIG. 11, taken along line XII.

One embodiment also adds an S-bar 18 to the inside of the rack's pocket. This S-bar 18 should be made of similar width material and is ideally bolted to the base arm 12 with the upper portion of the S-bar pointing outwards, towards the pocket opening (forming a backwards S when the pocket opening faces the left of the ladder rack, as shown in FIGS. 4, 6 and 12). This arrangement leaves a vertical portion to serve as a block and a slight hook for vertical control. Bolts 30 hold the S-bar 18 in position. An optional crossbar 20 may also be added to help secure the ladder rack 10 to the vehicle by providing a place in which to position an attachment structure, such as roof rack clamps 40. Bolts 30 may also hold the crossbar 20 to the base arm 12 of rack body 10 such that the base arm 12 is between the S-bar 18 and crossbar 20. Otherwise, the entire assembly could be welded or otherwise permanently fashioned together.

Figure 5:
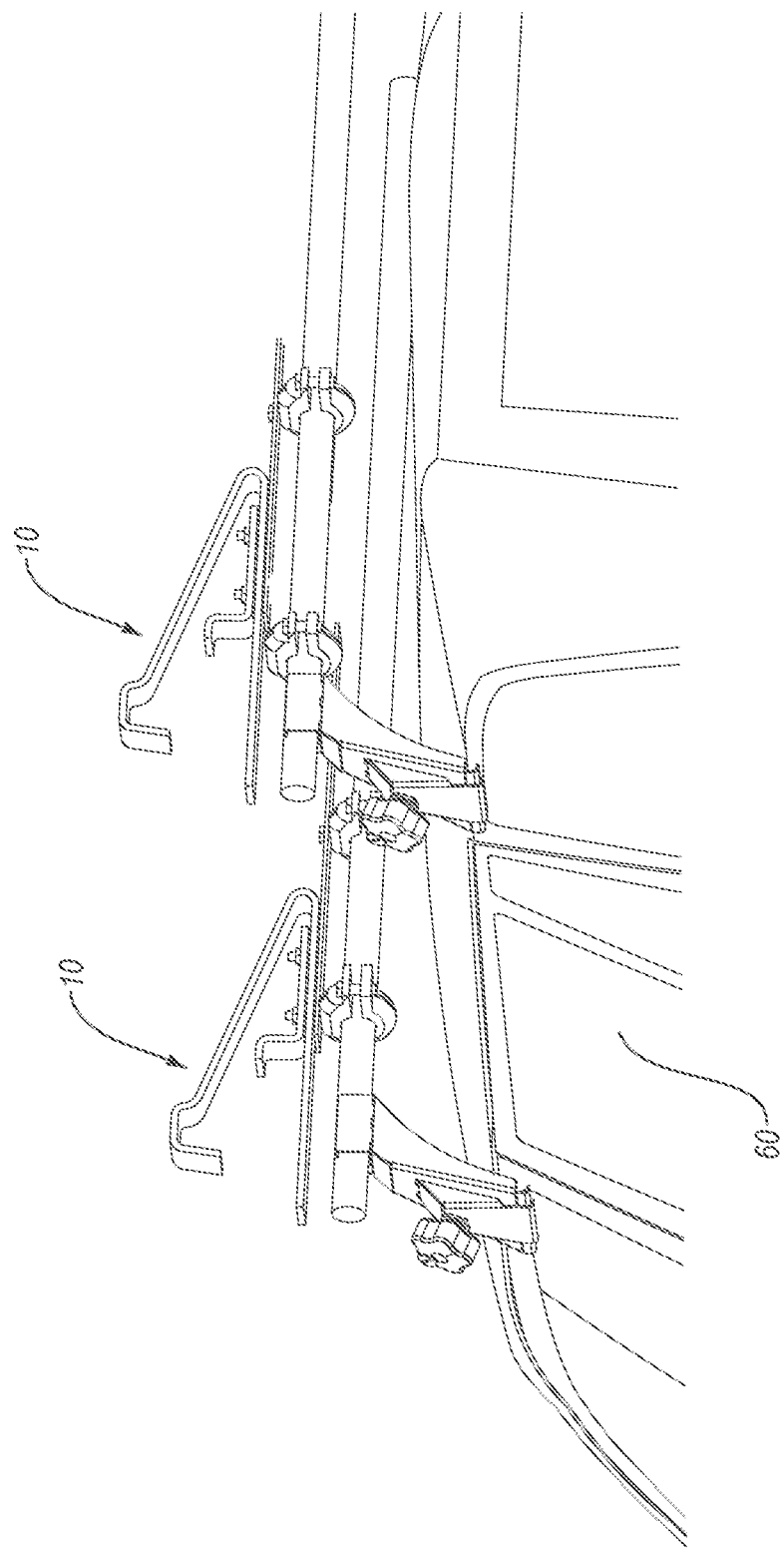
FIG. 5 is a perspective view of two ladder racks of FIG. 2, mounted on a roof rack of a vehicle.
Figure 7:
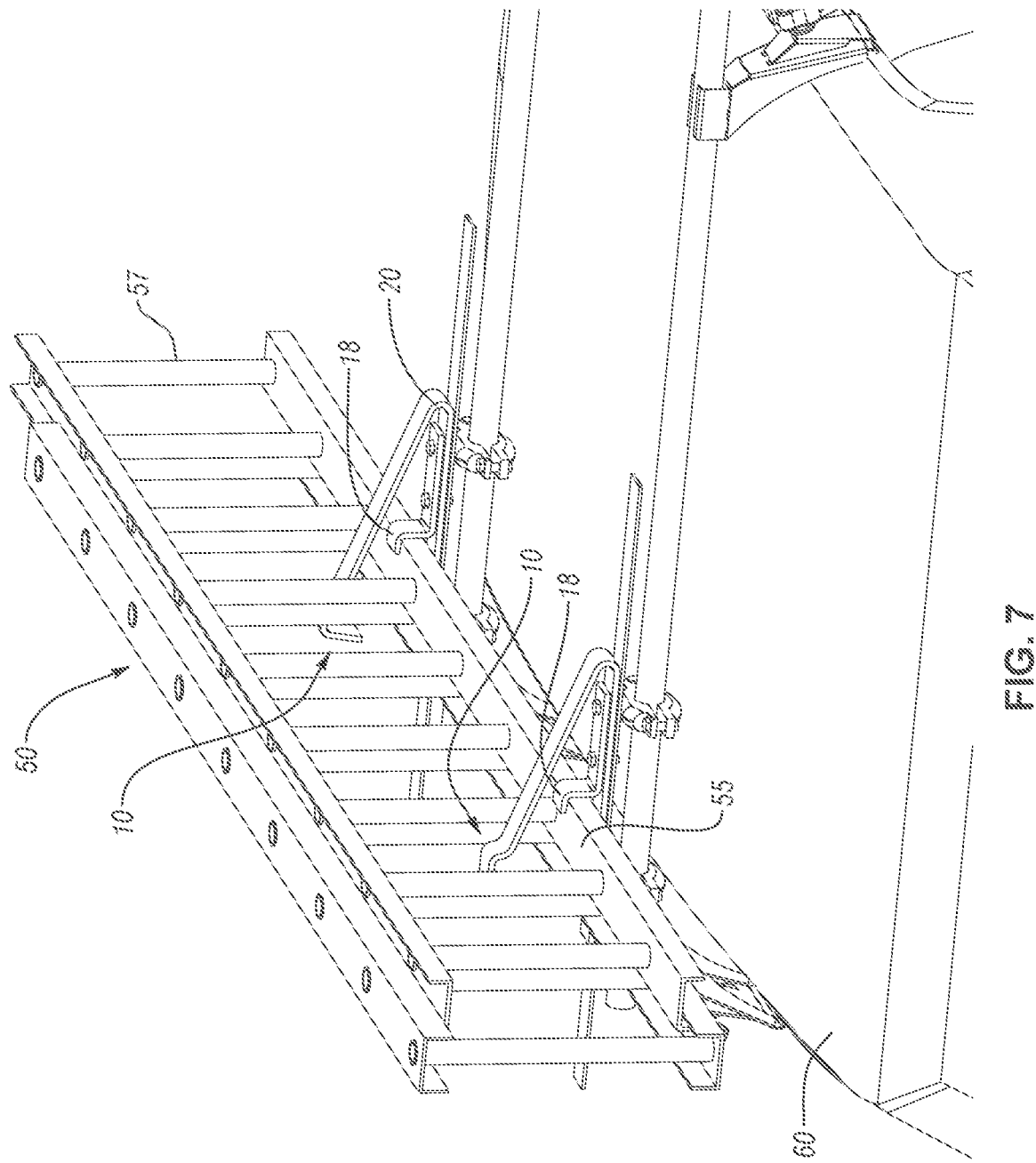
FIG. 7 is an alternate perspective view of the ladder rack and vehicle of FIG. 6.
Figure 8:
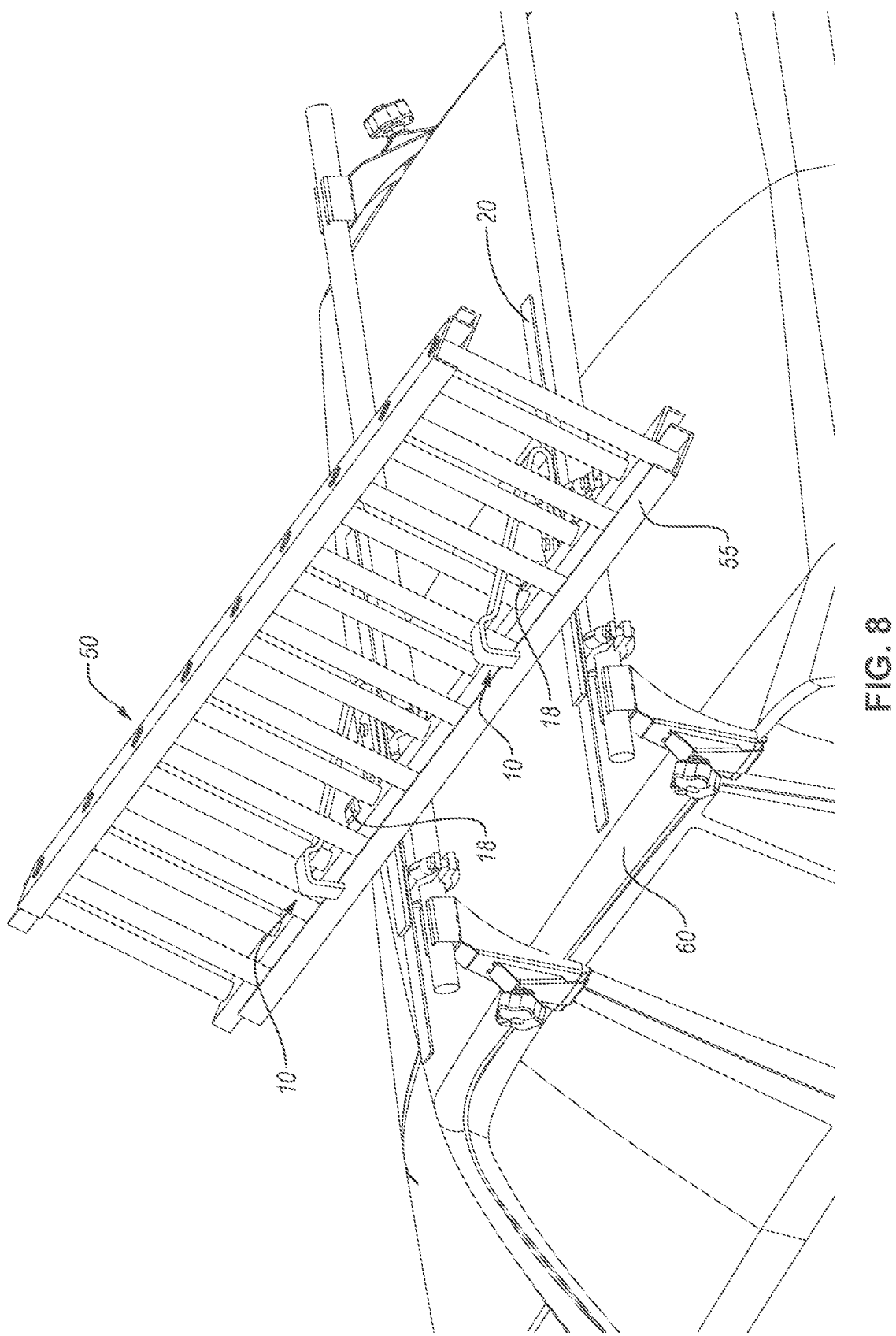
FIG. 8 is a perspective view of the ladder rack and vehicle of FIG. 7, at a second stage of installation.
Figure 9:
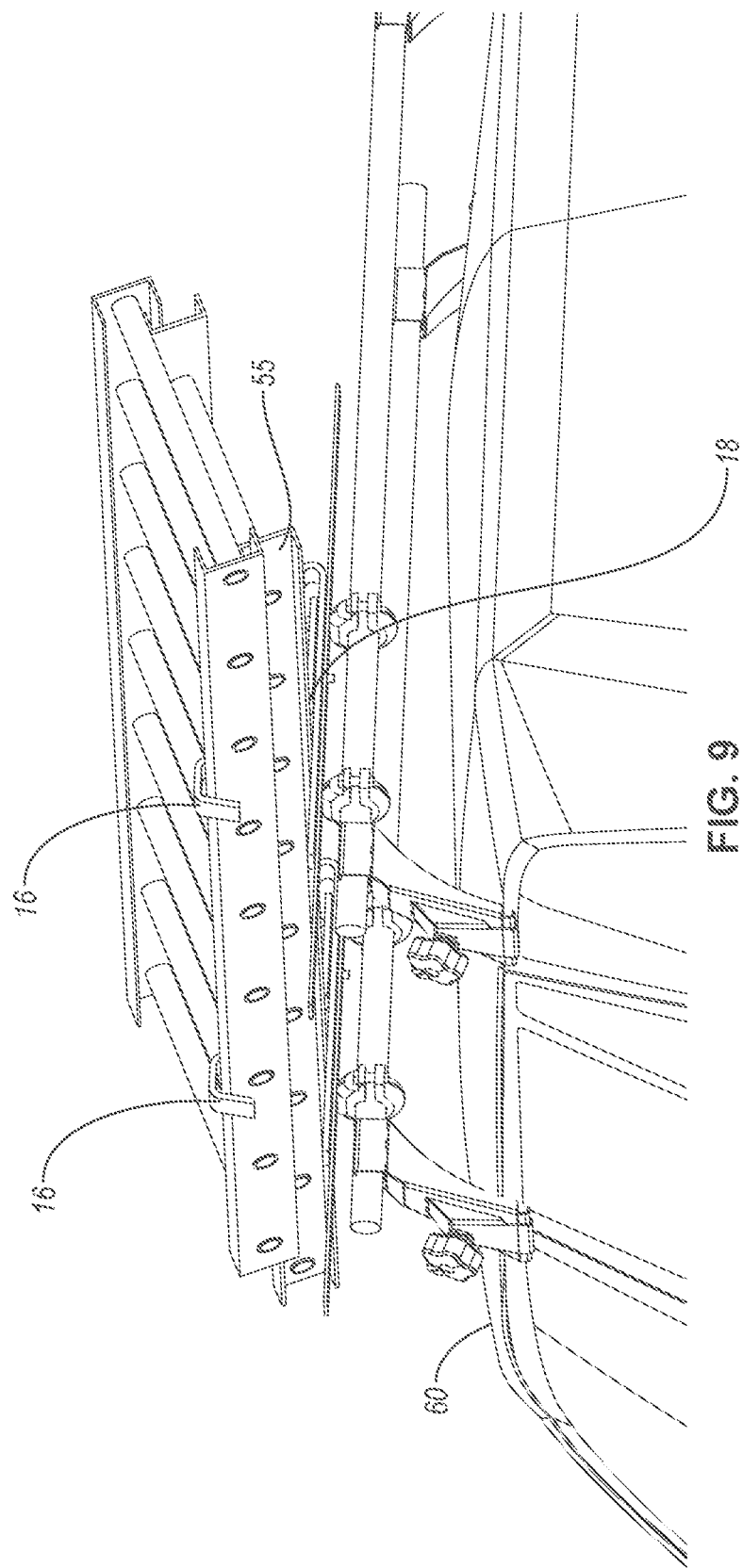
FIG. 9 is a perspective view of the ladder rack and vehicle of FIG. 7, at a third stage of installation.
Figure 10:
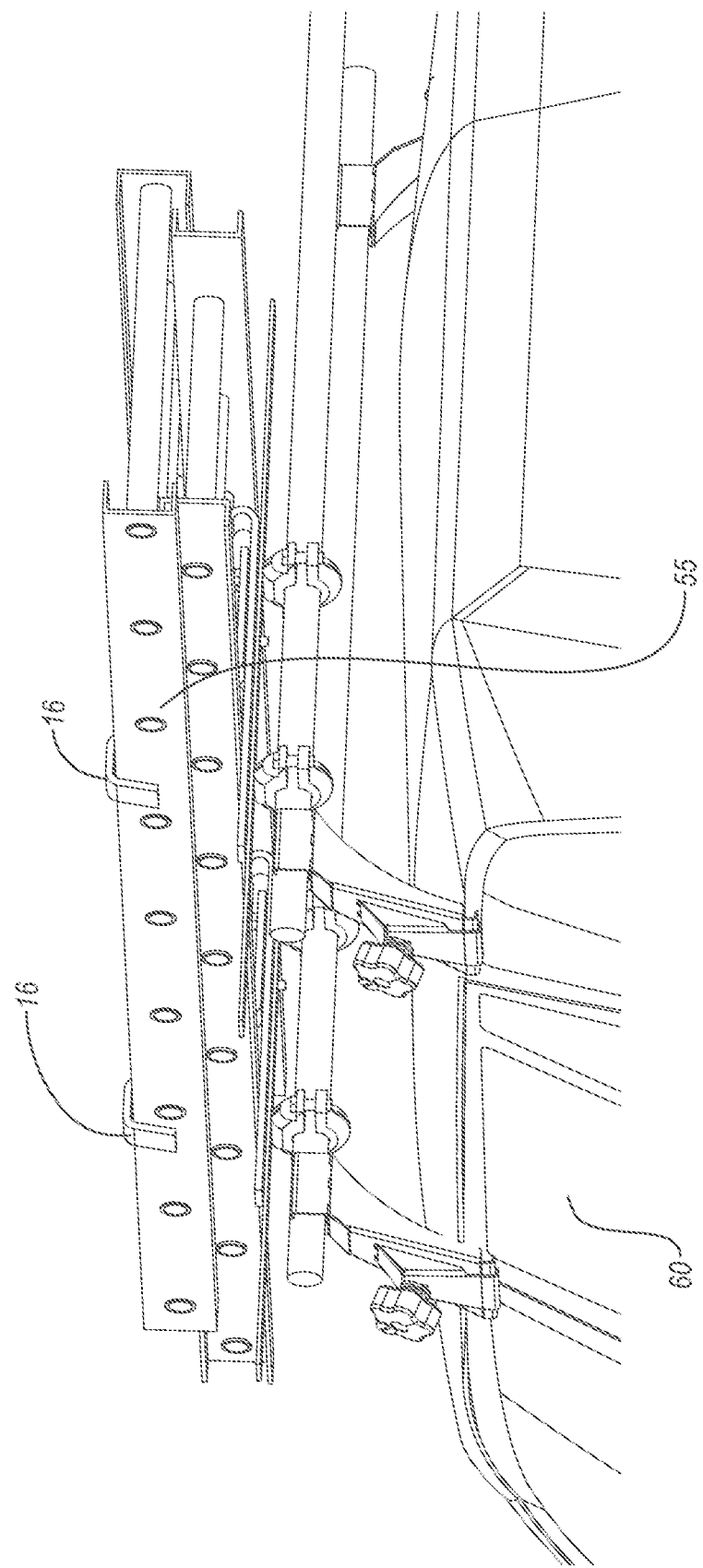
FIG. 10 is a perspective view of the ladder rack and vehicle of FIG. 7, with the ladder installed.
Figure 11:
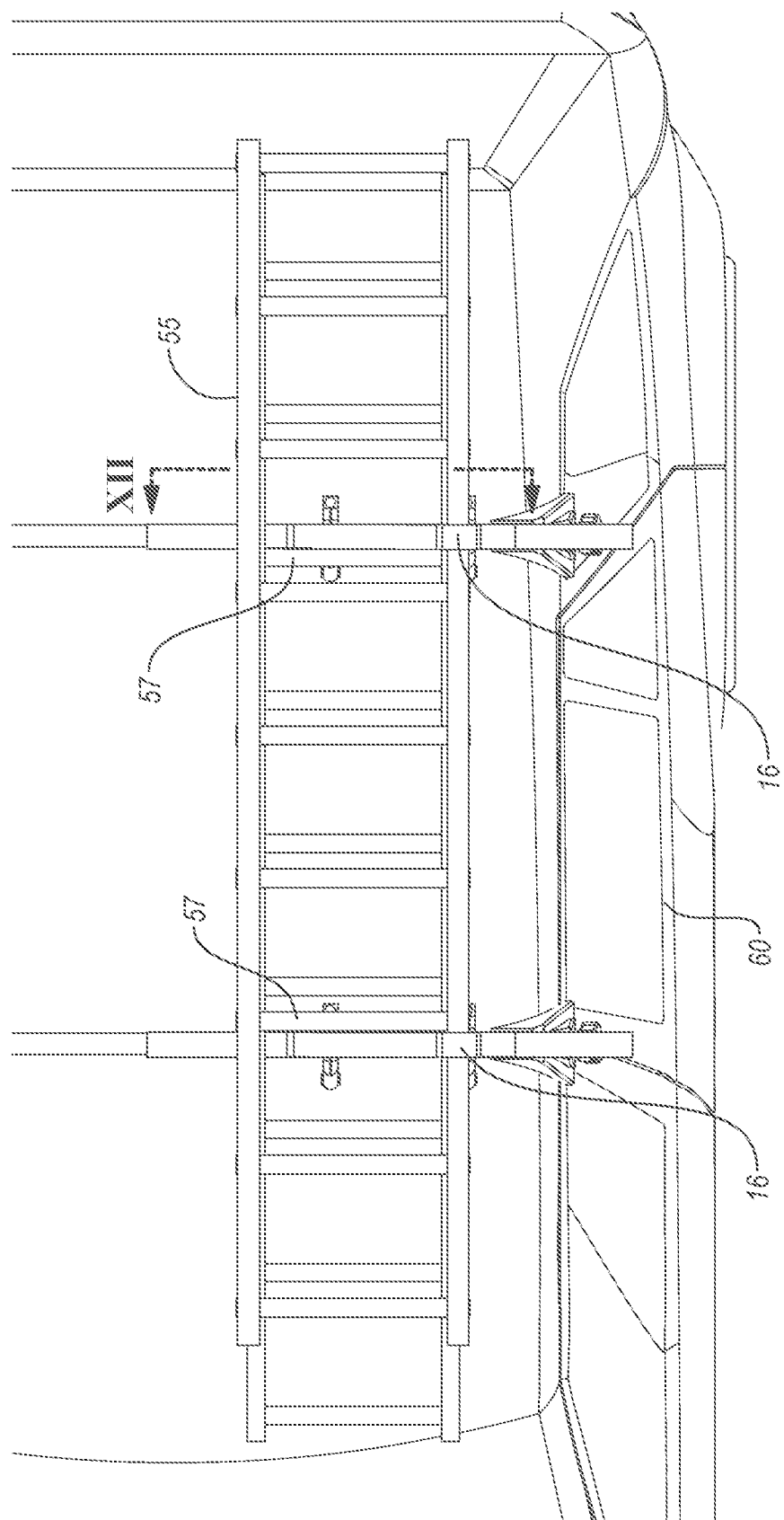
FIG. 11 is a top plan view of the ladder rack and vehicle of FIG. 10.

Two racks 10 may be mounted to a vehicle roof 60, as shown in FIG. 5, utilizing a standard vehicle rack. A ladder 50 may then be positioned with a rail 55 on the lower arm 12 of ladder rack 10 (FIGS. 6 and 7). The S-bar 18 interacts with the ladder rails 55 and serves as a stop to prevent over insertion of the ladder 50 (with its vertical piece) and to prevent rotation back onto the user (with the upper horizontal piece). The ladder 50 is then rotated downwards, over the roof of the vehicle 60 and onto the crossbar 20 (FIGS. 8-10). When properly positioned, ladder rail 55 will then reside within the hook 16 of the upper arm 14 with the two ladder racks 10 abutting opposite sides of the ladder's rungs, steps, or horizontals 57 (FIGS. 11 and 12). In this way, racks 10 serve to block translational movement of the ladder along the length of a vehicle 60 as the hooks 16 interfacing with the rungs 57 will block such motion. Hooks 16 will also prevent transverse motion, across the vehicle 60, as the rail 55 resides within the hook 16 and cannot escape so long as the lip of hook 16 extends sufficiently downward to block the ladder's motion. Ladder deployment merely requires a reversal of the steps outlined above. The addition of the S-bar 18 then serves to help control the ladder 50 during deployment by preventing over-rotation onto the user.

Although the present invention has been described with reference to preferred embodiments, numerous modifications and variations can be made and still the result will come within the scope of the invention. No limitation with respect to the specific embodiments disclosed herein is intended or should be inferred. It should be noted that the attachment structure for attaching the ladder rack to the vehicle can be any suitable means currently in and known in the market or later devised. Attachment structures may also be adapted specifically for roof racks, such as clamps 40, or any other structure. The preferred material for making the roof rack 10 and crossbar 20 is currently steel, but other materials, such as polymers, ceramics, or composite materials, could be used. The material must resist permanent deformation and be rugged enough to hold a ladder. The dimensions given in this specification are exemplary and only used to denote a preferred embodiment for use with most ladders. The ladder rack may be designed with different dimensions to accommodate diverse sizes of ladders. The S-bar 18 may be either omitted or be replaced with a simple vertical block, lacking the upper hook portion, though such embodiments will have reduced functionality.

What is claimed is:

1. A ladder rack comprising:
   a strip of rigid material forming an upper arm and a base arm joined at an acute angle such that the upper arm is located over the base arm;
   the upper arm further comprising a hook at a terminal end opposite the acute angle, said hook being formed from three bends within the strip of rigid material;
   the base arm and upper arm defining a pocket which further comprises a vertical block residing therein; and
   a crossbar mounted to the base arm;
   wherein a ladder may reside within the pocket such that a rail of the ladder will reside within the hook of the upper arm when the ladder is fully installed within the ladder rack, the vertical block arresting motion of the ladder during installation and the crossbar allowing mounting of the ladder rack to a vehicle.

2. The ladder rack of claim 1, the vertical block, base arm, and crossbar being bolted together with the base arm between the vertical block and crossbar.

3. The ladder rack of claim 1, the vertical block being an S-bar attached to the base arm in a manner that an upper portion of the S-bar points towards an opening of the pocket.

4. The ladder rack of claim 3 further comprising a crossbar mounted to the base arm to allow mounting of the ladder rack to a vehicle.

5. The ladder rack of claim 4, the S-bar, base arm, and crossbar being bolted together with the base arm between the S-bar and crossbar.

* * * * *